United States Patent [19]

Schläfer

[11] Patent Number: 4,818,814
[45] Date of Patent: Apr. 4, 1989

[54] WATER-SOLUBLE DISAZO COMPOUNDS CONTAINING THE 1-AMINO-8-HYDROXY-3,6-DISULFO-NAPHTHALENE MOIETY AS A BIVALENT COUPLING COMPONENT AND AN ANILINE OR NAPHTHYLAMINE COMPOUND HAVING A FIBER-REACTIVE GROUP, AND A 2-SULFO-5-ACYLAMINO-ANILINE AS DIAZO COMPONENTS,

[75] Inventor: Ludwig Schläfer, Kelkheim, Fed. Rep. of Germany

[73] Assignee: Hoechst Aktiengesellschaft, Frankfurt am Main, Fed. Rep. of Germany

[21] Appl. No.: 918,530

[22] Filed: Oct. 14, 1986

[30] Foreign Application Priority Data

Oct. 15, 1985 [DE] Fed. Rep. of Germany ....... 3536688

[51] Int. Cl.$^4$ .................. C09B 62/513; C09B 62/533; C09B 62/67; D06P 1/384
[52] U.S. Cl. ...................... 534/642; 534/582; 534/617; 534/641; 534/643; 534/63; 534/887
[58] Field of Search ............... 534/642, 643, 637, 617, 534/641

[56] References Cited

U.S. PATENT DOCUMENTS

| 3,419,541 | 12/1968 | Kuhne et al. | 534/641 X |
| 3,558,592 | 1/1971 | De Montmollin | 534/643 X |
| 4,425,270 | 1/1984 | Yamada et al. | 534/637 |
| 4,568,350 | 2/1986 | Rohrer | 534/642 X |

FOREIGN PATENT DOCUMENTS

| 0022265 | 10/1983 | European Pat. Off. | 534/637 |
| 0114032 | 7/1984 | European Pat. Off. | 534/637 |
| 0126026 | 11/1984 | European Pat. Off. | 534/642 |
| 0133283 | 2/1985 | European Pat. Off. | 534/637 |

Primary Examiner—Floyd D. Higel

[57] ABSTRACT

Water-soluble disazo compounds of the formula

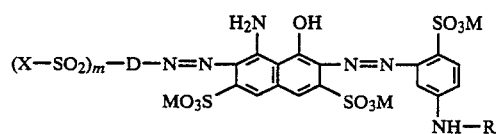

in which D is a benzene ring or a naphthalene ring which can both be substituted by substituents from the group consisting of chlorine, bromine, alkyl of 1 to 4 carbon atoms, alkoxy of 1 to 4 carbon atoms, carboxy and sulfo, X is the vinyl group or a β-sulfatoethyl group, R is a β-sulfatoethylsulfonyl, 3-(β-chloroethylsulfonyl)-benzoyl, 4-(β-chloroethylsulfonyl)-benzoyl, 3-(β-chloroethylsulfonylmethyl)-benzoyl, 4-(β-chloroethylsulfonylmethyl)-benzoyl,4-(β-chloroethylsulfonyl)-cinnamoyl, 3-(N-methyl-N-βchloroethylsulfonyl)-aminobenzoyl or 4-(N-methyl-N-β-chloroethylsulfonyl)-aminobenzoyl group, m is the number 1 or 2 and M denotes a hydrogen atom or an alkali metal.

The disazo compounds are suitable for use as dyes having fiber-reactive properties for dyeing hydroxy- and/or carboxamido-containing fiber material, such as in particular cellulose fiber materials and polyamide fiber materials.

These disazo compounds have good solubility and stability in printed pastes and dyebaths; they exhibit a high color strength and a good color buildup; and they produce, in high degrees of fixation, navy to black dyeings and prints with good fastness to, inter alia, light, wash, seawater, chlorinated water, acid, and alkali, and these dyeings and prints have stability toward copper ions.

10 Claims, No Drawings

WATER-SOLUBLE DISAZO COMPOUNDS CONTAINING THE 1-AMINO-8-HYDROXY-3,6-DISULFO-NAPHTHALENE MOIETY AS A BIVALENT COUPLING COMPONENT AND AN ANILINE OR NAPHTHYLAMINE COMPOUND HAVING A FIBER-REACTIVE GROUP, AND A 2-SULFO-5-ACYLAMINO-ANILINE

The invention relates to the technical field of fiber-reactive dyes.

U.S. Pat. No. 4,425,270 disclosed disazo dyes which, in exhaust dyeing onto cellulose fibers, have a satisfactory color yield only from dyeing temperatures of 70° C., i.e. only at relatively high dyeing temperatures for exhaust dyeing. They are thus only of limited applicability, and their application is associated with a high degree of uncertainty in the reproducibility of dyeings when the optimal temperature range of about 70° to 80° C. cannot be safely maintained. The same is true of the dyes described in European Patent Application publications Nos. 0,022,265A and 0,114,032A.

Furthermore, European Patent Application publication No. 0,133,283A discloses disazo dyes which, although they are useful fiber-reactive dyes, appear to be in need of improvement in regard of their degree of fixation on cellulose fiber materials in exhaust dyeing and also in the property of producing ideally equally strong dyeings independently of the dyeing temperature within the range of 40° to 80° C.

The present invention, then, provides new, useful, water-soluble disazo compounds which are very suitable for use as fiber-reactive dyes and produce dyeings in a very good and constant yield on cellulose fiber materials in exhaust dyeing, even over the very wide temperature range of from 30° to 80° C.

These disazo compounds according to the invention conform to the general formula (1)

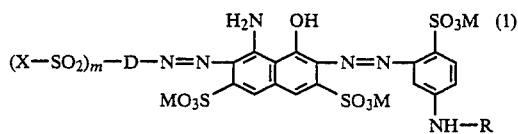

in which the meanings are:

D is a benzene ring or a naphthalene ring which can both be substituted by substituents from the group consisting of chlorine, bromine, alkyl of 1 to 4 carbon atoms, such as ethyl and thereof in particular methyl, alkoxy of 1 to 4 carbon atoms, such as ethoxy and thereof in particular methoxy, carboxy, and sulfo;

X is the vinyl group or a β-sulfatoethyl group;

R is a β-sulfatoethylsulfonyl, 3-(β-chloroethylsulfonyl)-benzoyl, 4-(β-chloroethylsulfonyl)-benzoyl, 3-(β-chloroethylsulfonylmethyl)-benzoyl, 4-(β-chloroethylsulfonyl-methyl)-benzoyl, 4-(β-chloroethylsulfonyl)-cinnamoyl, 3-(N-methyl-N-β-chloroethylsulfonyl)-aminobenzoyl or 4-(N-methyl-N-β-chloroethylsulfonyl)-aminobenzoyl group;

m is the number 1 or 2,

M is a hydrogen atom or an alkali metal, such as sodium, potassium or lithium.

The formula radical (X-SO₂)ₘ-D- is preferably a group of the general formula (2) or (3)

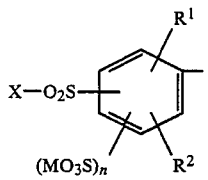

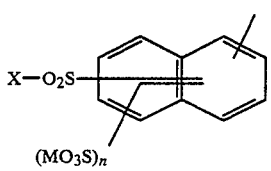

in which

R¹ and R² can be identical to or different from each other and

R¹ is hydrogen, methyl, methoxy, ethoxy, carboxy, chlorine or bromine,

R² stands for hydrogen, methyl, methoxy, ethoxy or chlorine, n stands for the number zero or 1 (where in the case of n being equal to zero this group denotes a hydrogen atom) and M and X have the abovementioned meanings.

R¹ and R² can be identical to or different from each other. Preferably they are a hydrogen atom or a methoxy group.

Preferably, furthermore, R is a β-sulfatoethylsulfonyl, 3-(β-chloroethylsulfonyl)-benzoyl, 4-(β-chloroethylsulfonylmethyl)-benzoyl or 4-(N-methyl-N-β-chloroethylsulfonyl)-aminobenzoyl group.

A sulfo group is a group of the general formula —SO₃M, a crboxy group is a group of the general formula —COOM and a sulfato group is a group of the general formula —OSO₃M, where in these formulae M has one of the above-mentioned meanings.

The disazo compounds according to the invention can be present in the form of their free acid and in the form of their alkali metal salts. They are preferably used in the form of these salts for dyeing or printing hydroxy and/or carboxamido-containing fiber material.

The present invention further provides a process for preparing these disazo compounds according to the invention, which comprises coupling a monoazo compound of the general formula (4)

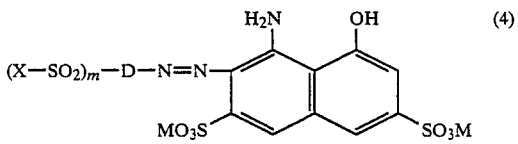

in whch m, D, M and X have the abovementioned meanings, with the diazonium compound of an aromatic amine of the general formula (5)

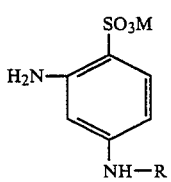

in which M and R have the abovementioned meanings.

The coupling reaction is effected analogously to known methods, for example in aqueous medium in the weakly acid to weakly alkaline range, preferably at a pH value between 3 and 8, in particular between 4 and 7, and at a temperature between 5° and 30° C., preferably between 10° and 25° C.

However, the disazo compounds according to the invention can also be prepared in a manner according to the invention in a single-vessel reaction. This is an advantageous method since the isolation of intermediates, such as, in particular, of the monoazo compound of the general formula (4), is dispensed with. Using the single-vessel method is possible because, in this single-vessel reaction, the compound of the general formula (1) is surprisingly formed preferentially. The present invention thus also provides a process for preparing a disazo compound according to the invention of the general formula (1), which comprises reacting two diazotized aromatic amines of the general formula (5) and of the general formula (6)

(X—SO$_2$)$_m$—D—NH$_2$     (6)

with m, D and X being of the abovementioned meaning, in an equivalent amount with 1-amino-8-naphthol-3,6-disulfonic acid as a bivalent coupling component in a mixture in a preferably aqueous medium first at a pH value between 0 and 3, preferably between 1 and 2, then at a pH value between 4 and 8, preferably between 4 and 7; the reaction temperature of the two coupling steps is between 0° and 30° C., preferably between 5° and 25° C.

The monoazo compounds conforming to the general formula (4) are known; they can be prepared analogously to known methods by reacting the diazonium salt of an aromatic amine of the general formula (6) with 1-amino-3,6-disulfo-8-naphthol in an acid medium at a pH value between 0 and 3, preferably between 1 and 2, and at a temperature between 5° and 30° C.

Aromatic amines conforming to the general formula (6), which serve as starting compounds for preparing the disazo compounds according to the invention, are for example:

1-Amino-4-phenyl β-sulfatoethyl sulfone, 1-amino-4-phenyl vinyl sulfone, 1-amino-3-phenyl β-sulfatoethyl sulfone, 1-amino-3-phenyl vinylsulfone, 1-amino-2-phenyl β-sulfatoethyl sulfone, 1-amino-2-methoxy-5-phenyl β-sulfatoethyl sulfone, 1-amino-2-methoxy-5-phenyl vinyl sulfone, 1-amino-4-methoxy-5-phenyl β-sulfatoethyl sulfone, 1-amino-2-methoxy-4-phenyl β-sulfatoethyl sulfone, 1-amino-2,5-dimethoxy-4-phenylβ-sulfatoethyl sulfone, 1-amino-2,5-dimethoxy-4-phenyl vinyl sulfone, 1-amino-2,4-dimethoxy-5-phenyl β-sulfatoethyl sulfone, 1-amino-2-methoxy-5-methyl-4-phenyl β-sulfatoethyl sulfone, 1-amino-2-methoxy-5-methyl-4-phenyl vinyl sulfone, 1-amino-2-methoxy-5-chloro-4-phenyl β-sulfatoethyl sulfone, 1-amino-2-chloro-5-phenyl β-sulfatoethyl sulfone, 1-amino-2,6-dichloro-4-phenyl β-sulfatoethyl sulfone, 1-amino-2-bromo-4-phenyl β-sulfatoethyl sulfone, 1-aminobenzene-5-β-sulfatoethylsulfonyl-2-carboxylic acid, 1-aminobenzene-4-β-sulfatoethylsulfonyl-2-sulfonic acid, 1-amino-4-naphthyl β-sulfatoethyl sulfone, 1-amino-5-naphthyl β-sulfato ehtyl sulfone, 2-amino-5-naphthyl β-sulfatoethyl sulfone, 2-amino-6-naphthyl β-sulfatoethyl sulfone, 2-amino-7-naphtyl β-sulfatoethyl sulfone, 2-amino-4,8-naththylene bis-β-sulfatoethyl sulfone, 2-aminonaphthalene-6-β-sulfatoethylsulfonyl-1-sulfonic acid and 2-aminonaphthalene-8-β-sulfatoethylsulfonyl-6-sulfonic acid.

The aromatic amines of the general formula (5) which serve as starting compounds can be prepared in a perfectly conventional and known manner by reacting 1,3-diaminobenzene-4-sulfonic acid with carbyl sulfate or with the acid chloride of the corresponding aromatic carboxylic acid. These methods are numerously described in the literature. Acylating agents are in particular, in addition to the abovementioned carbyl sulfate, 3-(β-chloro-ethylsulfonyl)-benzoyl chloride, 4-(β-chloroethylsulfonyl)-benzoyl chloride, 4-(β-chloroethylsulfonylmethyl)-benzoyl chloride, 4-(β-chloroethylsulfonyl)-cinnamoyl chloride, 3-(N-methyl-N-β-chloroethylsulfonyl)-aminobenzoyl chloride and 4-(N-methyl-N-β-chloroethylsulfonyl)-aminobenzoyl chloride.

The compounds according to the invention can be isolated from their synthesis mixtures by generally known methods for water-soluble compounds, for example by precipitating from the reaction medium by means of an electrolyte, such as, for example, sodium chloride or potassium chloride, or by evaporating the reaction solution itself, for example by spray-drying.

If the latter way of isolating the compounds according to the invention is chosen, it is advisable that in those cases where the reaction solution contains sizable amounts of sulfate, the sulfate present in the solutions be removed before the evaporating step by precipitation as calcium sulfate and removal thereof by filtration. In some cases it can also be desirable to use the dye solution directly as a liquid formulation for dyeing, if desired after concentrating and/or adding buffer substances.

The new compounds of the present invention are highly suitable for use as dyes, in particular as fiber-reactive dyes, for dyeing or printing materials made of hydroxy- and/or carboxamido-containing fibers, such as, in particular, natural or regenerated cellulose or natural, regenerated or synthetic polyamides or polyurethanes, such as, for example, cotton, hemp, linen, jute, filament viscose rayon, wool, silk, nylon-6, nylon-6.6, nylon-11 or nylon-4. The new compounds are particularly suitable for dyeing and printing cellulose fiber materials.

The new compounds can be applied to and fixed on the substrates mentioned analogously to the known and customary dyeing and printing methods for water-soluble, in particular fiber-reactive, dyes. They have a good to very good solubility and stability in the printed pastes and dyebaths, they exhibit a high color strength and a good color buildup, and they produce, in high degrees of fixation, navy to black dyeings and prints which, in particular in the case of dyeings and prints on cellulose fibers, are distinguished by good to very good end-use and manufacturing fastness properties, such as, for example, light, wash, seawater, chlorinated water, acid and alkali fastness properties, cross-dyeing fastness properties, alkaline and acid perspiration fastness properties, gas fume fading fastness properties (fastness to nitrogen oxides) and also hot-press, pleating, decatizing, drycleaning and crock fastness properties. Unfixed dye portions are readily washed off. In the same way the dyes and prints of the compounds according to the invention have a high stability toward copper ions and toward substances which give off copper ions. When using the compounds according to the invention for printing cellulose fiber materials, moreover, harshening of the hand of the dyed material is avoided; furthermore, the prints have crisp contours and a clear white ground. The prints and dyeings prepared with the compounds according to the invention do not mark off or bleed in the unfixed state during cuttling and plaiting, and have a high stability to acid storage and thus are not subject to acid fading.

In particular, however, the very good wet and dry light fastness properties deserve emphasis. Very good wet light fastness properties are obtained on exposing to light dyeings and prints which have been impregnated with distilled water, with tap water and with alkaline and acid perspiration solutions. These wet light fastness properties have in the meantime attained a high end-use value.

The present invention further provides the use of the compounds according to the inventio for dyeing or printing the abovementioned fiber materials, or rather a process for dyeing or printing the abovementioned fiber materials where the compounds according to the invention are applied and subsequently fixed to the fiber material analogously to known and customary methods of the dyeing and printing industry. For example, these methods are carried out by treating cellulose fiber materials in an aqueous dyebath which may contain customary dyeing assistants by the exhaust method using alkaline agents, for instance at a temperature between 15° and 105° C. and preferably between 40° and 80° C., the fiber material being dyed in very good color yields. In the temperature range between 40° and 80° C., in particular 40° and 70° C., the very high degree of fixation is affected by the dyeing temperature only to a small extent; the consequence is a dyeing having a uniformly very good color yield which is essentially independent of the selected dyeing temperature within this temperature range.

The padding methods which are known and customary in the industry likewise produce dyeings having excellent color yields on cellulose fiber materials; this process can be carried out in one or two steps, so that the fixing can be carried out by means of the alkaline agent which was applied to the fiber material simultaneously with or subsequently to the application of the dye, or by dwelling the padded fiber material for 5 minutes to 20 hours at room temperature or temperatures up to 60° C. or by steaming or by treatment with dry heat. Unfixed dye portions can be easily washed off.

The use of the compounds according to the invention in printing is effected analogously to the known customary printing and fixing methods for dyeing cellulose fibers. Preferred possibilities are a one-step method involving a print paste containing the compound according to the invention and sodium bicarbonate or another acid-binding agent, such as potassium bicarbonate, sodium carbonate, potassium carbonate, sodium hydroxide, potassium hydroxide or sodium trichloroacetate, and subsequently steaming the printed material at 101° to 103° C., or a two-step method involving printing with a neutral or weakly acid print paste which contains the compound according to the invention and subsequent fixing by means of a hot, electrolyte-containing, alkaline bath or by overpadding with an alkaline, electrolyte-containing liquor and subsequent dwelling, steaming or dry heat treatment of the overpadded material. The results are strong prints with well-defined contours and a clear white ground. The prints exhibit a high shade constancy irrespective of the fixing conditions.

The dyeing of the polyamide or polyurethane fibers is customarily carried out from an acid medium. For instance, the dyebath can have added to it acetic acid or a buffer of acetic acid and ammonium acetate in order to obtain the desired pH value. For the purpose of achieving an acceptable levelness of the dyeing it is advisable to add customary leveling assistants, for example based on a reaction product or cyanuric chloride with three times the molar amount of an aminobenzenesulfonic acid and/or an aminonaphthalenesulfonic acid or based on the reaction product of stearylamine with ethylene oxide. The dyeings can be carried out not only at the boil but also at 110° to 120° C.

The Examples below serve to illustrate the invention. The disazo compounds according to the invention which have been written as formulae are shown in the form of the free acids; in general they are prepared and isolated in the form of their sodium or potassium salts and used for dyeing in the form of their salts. Similarly, the starting compounds mentioned in the form of the free acid in the Examples below, in particular the tabulated examples, can be used as such or in the form of their salts, preferably alkaline metal salts, such as sodium or potassium salts, in the synthesis.

The parts and percentages mentioned in the Examples are by weight, unless otherwise stated. Parts by weight relate to parts by volume as the kilogram relates to the liter.

The visible absorption maxima ($\lambda_{max}$) are quoted for the alkali metal salts of the compounds according to the invention and have been deterimined in aqueous solution.

EXAMPLE 1

28.1 parts of 4-aminophenyl $\beta$-sulfatoethyl sulfone are diazotized in conventional manner in a mixture of 100 parts of ice-water and 35 parts of 31% strength aqueous hydrochloric acid with 13.1 parts by volume of an aqueous 40% strength sodium nitrite solution. After the diazotization reaction has ended, 31.9 parts of 1-amino-8-naphthol-3,6-disulfonic acid are added, the pH value is brought to 1 to 2 and the coupling reaction is completed within this pH range at a temperature below 10° C. with about 4 hours of stirring.

After the coupling reaction has ended, a diazonium salt suspension is added, this diazonium salt suspension having been prepared as follows: a neutral solution of 28.2 parts of 1.3-diaminobenzene-4-sulfonic acid in 300 parts of water has added to it 15 parts of sodium bicarbonate, followed in the course of one hour and with thorough stirring by a solution of 48.2 parts of 3-$\beta$-chloroethylsulfonylbenzoyl chloride in 150 parts of acetone. The reaction mixture is then cooled down to 10° C., and a mixture of 100 parts of ice and 16 parts of concentrated sulfuric acid are added; 13.5 parts by volume of a 40% strength aqueous sodium nitrite solution are then added, and the batch is stirred for a further two hours.

After addition of this diazonium salt suspension to the acid solution of the coupling component, this coupling batch is neutralized by means of about 28 parts of sodium carbonate; the compound according to the invention is isolated as an electrolyte (such as sodium chloride and sodium sulfate)-containing product by evaporated to dryness or by spray-drying. The disazo compound according to the invention, written in the form of the free acid, has the following formula:

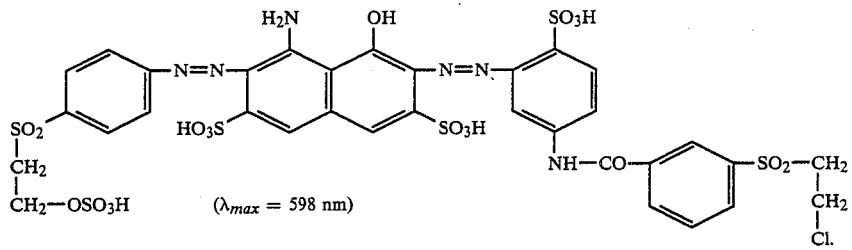

($\lambda_{max}$ = 598 nm)

The compound according to the invention has good fiber-reactive dye properties and, applied by the dyeing and fixing methods customary for fiber-reactive dyes, produces on the fiber materials mentioned in the description, such as in particular on celulose fiber materials, for example on cotton, with a high degree of fixation, strong navy dyeings and prints having good to very good end-use fastness properties, of which in particular the excellent light fastness properties on dry fabric and fabric impregnated with tap water or aqueous perspiration solutions and the excellent chlorine, wash and perspiration fastness properties deserves emphasis.

EXAMPLE 2

A warm solution at 60° C. of 113 parts of 4-(β-chlorethylsulfonylmethyl)-benzoyl chloride in 160 parts of toluene is added in the course of an hour and with thorough stirring to a neutral solution of the sodium salt of 68 parts of 1,3-diaminobenzene-4-sulfonic acid and 40 parts of sodium bicarbonate in 360 parts of water; in the course of the hour, the pH value drops from 7.5 to 5.5. After this condensation reaction has ended, the reaction mixture has added to it 600 parts of ice and 110 parts of concentrated sulfuric acid and is then diazotized in conventional manner with 72 parts by volume of an aqueous 5N sodium nitrite solution.

This diazonium salt suspension has added to it as a second diazo component 101 parts of 4-(β-sulfatoethylsulfonyl)-aniline and is diazotized by further addition of about 75 parts by volume of a 5N sodium nitrite solution. This is followed by two hours of stirring and removal of excess nitrite with amidosulfonic acid.

This reaction batch containing the mixture of diazonium salts has gradually added to it 110 parts of 1-amino-8-naphthol-3,6-disulfonic acid and is further stirred, initially at a pH value of 2 to below 1 and a temperature of 0° to 5° C. After about 5 hours the pH value is adjusted by means of about 110 parts of anhydrous sodium carbonate to a pH value of 5 to 6, which is followed by some more stirring until the coupling reaction has ended.

The compound according to the invention is obtained by evaporating or spray-drying the synthesis solution.

However, it is advantageous to salt out the disazo dye according to the invention with 500 parts of sodium chloride or potassium chloride to remove small portions of other byproduct-azo compounds which have a red or violet color.

The bluish-black powder obtained contains, in addition to the electrolyte salt, the alkali metal salt according to the invention of the compound of the formula

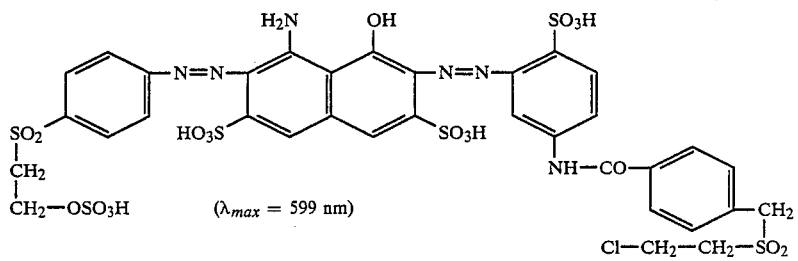

($\lambda_{max}$ = 599 nm)

which, like the compound according to the invention of Example 1, has very good fiber-reactive dye properties and, applied by the application and fixing methods customary in the industry for fiber-reactive dyes, dyes in particular cellulose fiber materials in deep navy shades. The fastness properties of the obtainable dyeings and prints correspond in quality to those which are obtainable with the compound according to the invention of Example 1.

EXAMPLE 3

34 parts of 3-β-chloroethylsulfonylbenzoyl chloride in the molten state (at 60° C.) are gradually added at a pH value between 3 and 6 to 18.8 parts of 1,3-diaminobenzene-4-sulfonic acid in aqueous solution. After the acylation reaction has ended, 180 parts by volume of a 31% strength aqueous hydrochloric acid are added to the batch which is cooled down to 0° to 5° C., if necessary by adding ice, and then diazotize in conventional manner by means of 14 parts by volume of a 40% strength aqueous sodium nitrite solution; the diazotization batch is stirred at 0° to 10° C. for approximately a further 30 minutes.

A suspension of 28.1 parts of 4-(β-sulfatoethylsulfonyl)-aniline in 100 parts of water is then added, and the aniline compound is diazotized by means of a further 14 parts by volume of a 40% strength aqueous sodium nitrite solution. The diazotization batch is subsequently stirred for a further 2 hours in the presence of a distinct nitrite excess, and thereafter excess nitrite is removed in conventional manner.

30.3 parts of 1-amino-8-naphthol-3,6-disulfonic acid are added to this batch of the two diazonium salts, which is subsequently stirred for a further 3 hours at a pH value between 1 and 2 and a temperature between 0° and 10° C. and is then brought to pH 6 to 6.5 (by means of about 50 parts of sodium bicarbonate), and the compound according to the invention is isolated by salting out with sodium chloride or potassium chloride or by evaporating or spray-drying the aqueous synthesis solution.

This gives a black electrolyte-containing powder of the alkali metal salt according to the invention shown in Example 1, which has the same good dye properties.

EXAMPLE 4

A suspension of 45 parts of 1-amino-3-[4'-β-chloroethylsulfonyl-methyl)-benzoylamino]-benzene-6-sulfonic acid and 28.1parts of 4-β-sulfatoethylsulfonyl-aniline in 400 parts of water is brought to pH 7 with sodium carbonate and subsequently stirred for one hour. 60 parts by volume of an aqueous 31% strength hydrochloric acid and 200 parts of ice are then added, and the batch is diazotized in conventional manner with 27 parts by volume of a 40% strength aqueous sodium nitrite solution. After addition of the nitrite the batch is stirred at 0° to 10° C. for a further 3 hours; excess nitrite is then destroyed, the suspension is brought to pH 2, 28.7 parts of 1-amino-8-naphthol-3,6-disulfonic acid are added, the batch is initially stirred for a further 4 hours and is then brought to pH 6 to 7 and is subsequently stirred for some more hours until the coupling reaction has ended.

The compound according to the invention is isolated by salting out with sodium chloride or potassium chloride or by evaporating or spray-drying. It is identical to the alkali metal salt according to the invention of Example 2 and has the same good fiber-reactive dye properties.

Example 5

A neutral aqueous solution of 18.8 parts of 1,3-diamino-benzene-4-sulfonic acid in 200 parts of water has added to it 20 parts of sodium bicarbonate and is cooled down to 10° C. A warm solution at 60° C. of 36 parts of 4-(β-chloroethylsulfonylmethyl)-benzoyl chloride in 80 parts of chlorobenzene is steadily added with thorough stirring in the course of one hour, the batch is subsequently stirred at a pH value of 5 to 6 for a further 2 hours, 18 parts of concentrated sulfuric acid and 100 parts of ice are then added, and diazotization is brought about in conventional manner.

An aqueous solution of 61.1 parts of a monoazo compound which has been obtained by acid coupling of diazotized 4-β-sulfatoethylsulfonyl-aniline onto 1-amino-8-naphthol-3,6-disulfonic acid is then added to the diazonium salt suspension. The coupling reaction takes place in a pH range between 5 and 6.

The resulting compound according to the invention is isolated out of the synthesis batch in conventional manner. It corresponds to the compound according to the invention described in Example 2 and has the same good fiber-reactive dye properties.

EXAMPLE 6

A neutral aqueous solution of 18.8 parts of 1,3-diaminobenzene-4-sulfonic acid in 200 parts of water has added to it, while maintaining a temperature of 5° to 10° C. and pH value of 5 to 7, a solution of 4-(N-methyl-N-β-chloroethylsulfonyl)-aminobenzoyl chloride in 100 parts of ethylene chloride. After the condensation reaction has ended, 14 parts by volume of an aqueous 40% strength sodium nitrite solution are added, and the entire batch is stirred out onto a mixture of 60 parts by volume of an aqueous 31% strength hydrochloric acid and 100 parts of ice. This is followed by a further hour of stirring and then addition of a neutral aqueous solution of 4-β-sulfatoethylsulfonylaniline and further 14 parts by volume of an aqueous 40% strength sodium nitrite solution, and the diazonium salt mixture is stirred for a further two hours at pH value between 1 and 2 and a temperature between 0° and 10° C. Excess nitrite is then destroyed, and 30 parts of 1-amino-8-naphthol-3,6-disulfonic acid are added to the suspension of the diazonium salts. The coupling batch is stirred for 3 to 5 hours while maintaining a pH value of less than 2 and is subsequently brought to a pH value of 5 and 6 with sodium carbonate; this is followed by stirring for some more time and then clarification with 10 parts of active carbon or kieselguhr. The disazo compound according to the invention is isolated in conventional manner by salting out or spray-drying.

The result obtained is a bluish-black, electrolyte-containing powder of the alkali metal salt according to the invention of the compound of the formula

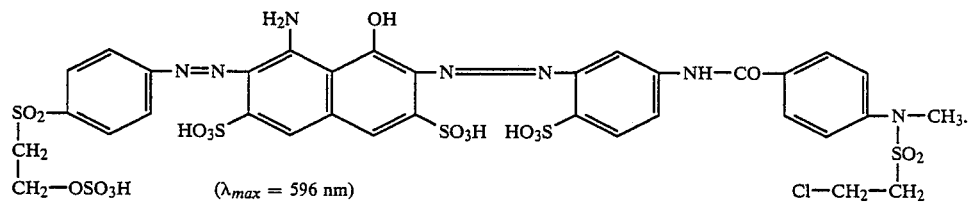

(λ$_{max}$ = 596 nm)

This compound according to the invention has very good fiber-reactive dye properties and, applied by the application and fixing methods customary for fiber-reactive dyes, produces on the fiber materials mentioned in the description, in particular on cellulose fiber materials, strong navy dyeings having good fastness properties, of which in particular the wet light fastness properties deserve emphasis.

EXAMPLE 7

A neutral solution of 37.6 parts of 1,3-diaminobenzene-4-sulfonic acid in 200 parts of water has added to it 96 parts of sodium bicarbonate and 180 parts of ice. 120 parts of carbyl sulfate are gradually added at a temperature between −5° C. and +2° C. in the course of 90 minutes; the batch is subsequently stirred for a further hour and then has added to it 200 parts of ice and 18 parts by volume of concentrated sulfuric acid. The amino compound is then diazotized in conventional manner with 20 parts by volume of an aqueous 40% strength sodium nitrite solution. An aqueous suspension of the diazonium salt of 4-(β-sulfatoethylsulfonyl)-aniline as a further diazo component is added in the equivalent amount.

The diazonium salt suspension obtained is brought with sodium bicarbonate to a pH value of 2, and 41.5 parts of 1-amino-8-naphthol-3,6-disulfonic acid are added. The acid coupling mixture is subsequently stirred for 3 to 5 hours, is then brought to pH 5.5 to 7 and stirred some more, and the compound according to the invention is isolated in conventional manner.

This gives a black, electrolyte-containing powder of the alkali metal salt according to the invention of the compound of the formula

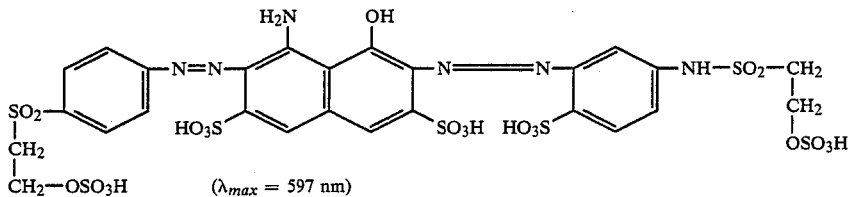

($\lambda_{max}$ = 597 nm)

which has very good fiber-reactive dye properties and, applied by the dyeing and printing methods customary in the industry, dyes in particular cellulose fiber materials in strong navy shades. The dyeing and prints obtainable with this dye have good fastness properties, of which in particular the wet light fast properties deserve emphasis.

EXAMPLES 8 to 48

The tabulated examples below describe further compounds according to the invention and conforming to the general formula (1) in terms of their formula radicals. They can be prepared in a manner according to the invention, for example analogously to one of the above worked Examples, with the corresponding starting compounds and have very good fiber-reactive dye properties. Applied by the application and fixing methods customary for fiber-reactive dyes, they produce in particular on cellulose fiber-materials strong dyeings and prints having the shade indicated in each case and good fastness properties, of which in particular the wet light fastness properties deserve emphasis.

| Example | Compound of the formula (1) with X—SO₂—D— equal to ... | R equal to ... | Hue ($\lambda_{max}$ = ... nm) |
|---|---|---|---|
| 8 | 4-(β-sulfatoethylsulfonyl)-phenyl | Vinylsulfonyl | Navy (596) |
| 9 | 4-(β-sulfatoethylsulfonyl)-phenyl | 4-(β-chloroethylsulfonyl)-benzoyl | Navy (596) |
| 10 | 4-(β-sulfatoethylsulfonyl)-phenyl | 3-(β-chloroethylsulfonyl-methyl)-benzoyl | Navy (598) |
| 11 | 4-(β-sulfatoethylsulfonyl)-phenyl | 4-(β-chloroethylsulfonyl)-cinnamoyl | Navy (599) |
| 12 | 4-(β-sulfatoethylsulfonyl)-phenyl | 3-(N—methyl-N—β-chloroethylsulfonyl)-aminobenzoyl | Navy (598) |
| 13 | 3-(β-sulfatoethylsulfonyl)-phenyl | β-sulfatoethylsulfonyl | Navy |
| 14 | 3-(β-sulfatoethylsulfonyl)-phenyl | 3-(β-chloroethylsulfonyl)-amino-benzoyl | Navy |
| 15 | 3-(β-sulfatoethylsulfonyl)-phenyl | 4-(β-chloroethylsulfonyl-methyl)-benzoyl | Navy |
| 16 | 3-(β-sulfatoethylsulfonyl)-phenyl | 4-N—β-methyl-N—β-chloroethylsulfonyl amino-benzoyl | Navy |
| 17 | 4-(β-sulfatoethylsulfonyl)-2-methoxy-5-methyl-phenyl | β-sulfatoethylsulfonyl | Navy |
| 18 | 3-(β-sulfatoethylsulfonyl)-phenyl | 3-(β-chloroethylsulfonyl)-benzoyl | Navy |
| 19 | 3-(β-sulfatoethylsulfonyl)-phenyl | 4-(β-chloroethylsulfonyl)-phenyl | Navy |
| 20 | 3-(β-sulfatoethylsulfonyl)-phenyl | 4-N—β-methyl-N—chloroethylsulfonyl amino-benzoyl | Navy |
| 21 | 3-(β-sulfatoethylsulfonyl)-phenyl | 4-(β-chloroethylsulfonyl)-cinnamoyl | Navy |
| 22 | 4-(β-sulfatoethylsulfonyl)-2,5-dimethoxy-phenyl | β-sulfatoethylsulfonyl | Navy |
| 23 | 3-(β-sulfatoethylsulfonyl)-phenyl | 3-(β-chloroethylsulfonyl)-benzoyl | Navy |
| 24 | 3-(β-sulfatoethylsulfonyl)-phenyl | 4-(β-chloroethylsulfonylmethyl)-benzoyl | Navy |
| 25 | 3-(β-sulfatoethylsulfonyl)-phenyl | 4[N—β-methyl-N—β-chloroethylsulfonyl]-amino-benzoyl | Navy |
| 26 | 3-(β-sulfatoethylsulfonyl)-phenyl | 3-(β-chloroethylsulfonylmethyl)-benzoyl | Navy |
| 27 | 6-(β-sulfatoethylsulfonyl)-1-sulfo-2-naphthyl | β-sulfatoethylsulfonyl | Navy |
| 28 | 6-(β-sulfatoethylsulfonyl)-1-sulfo-2-naphthyl | 3-(β-chloroethylsulfonyl)-benzoyl | Navy |
| 29 | 6-(β-sulfatoethylsulfonyl)-1-sulfo-2-naphthyl | 4-(β-chloroethylsulfonylmethyl)-benzoyl | Navy |
| 30 | 6-(β-sulfatoethylsulfonyl)-2-naphthyl | β-sulfatoethylsulfonyl | Navy |
| 31 | 6-(β-sulfatoethylsulfonyl)-1-sulfo-2-naphthyl | 3-(β-chloroethylsulfonyl)-benzoyl | Navy |
| 32 | 6-(β-sulfatoethylsulfonyl)-1-sulfo-2-naphthyl | 4-(β-chloroethylsulfonylmethyl)-benzoyl | Navy |
| 33 | 8-(β-sulfatoethylsulfonyl)-6-sulfo-2-naphthyl | β-sulfatoethylsulfonyl | Navy |
| 34 | 6-(β-sulfatoethylsulfonyl)-1-sulfo-2-naphthyl | 3-(β-chloroethylsulfonyl)-benzoyl | Navy |
| 35 | 6-(β-sulfatoethylsulfonyl)-1-sulfo-2-naphthyl | 4-(β-chloroethylsulfonylmethyl)-benzoyl | Navy |
| 36 | 4-(β-sulfatoethylsulfonyl)-2-methoxy-phenyl | β-sulfatoethylsulfonyl | Navy |
| 37 | 6-(β-sulfatoethylsulfonyl)-1-sulfo-2-naphthyl | 3-(β-chloroethylsulfonyl)-benzoyl | Navy |
| 38 | 6-(β-sulfatoethylsulfonyl)-1-sulfo-2-naphthyl | 4-(β-chloroethylsulfonylmethyl)-benzoyl | Navy |
| 39 | 4-vinylsulfonylphenyl | 4-(β-chloroethylsulfonylmethyl)-benzoyl | Navy |

-continued

| Example | Compound of the formula (1) with X—SO₂—D— equal to ... | R equal to ... | Hue ($\lambda_{max}$ = ... nm) |
|---|---|---|---|
| 40 | 3-vinylsulfonylphenyl | 4-(β-chloroethyl-sulfonylmethyl)-benzoyl | Navy |
| 41 | 4-(β-sulfatoethyl-sulfonyl)-2-methoxy-phenyl | 4-(β-chloroethyl-sulfonylmethyl)-benzoyl | Navy |
| 42 | 3-vinylsulfonyl-6-methoxy-phenyl | 4-(β-chloroethyl-sulfonylmethyl)-benzoyl | Navy |
| 43 | 3-vinylsulfonyl-4-methoxy-phenyl | 4-(β-chloroethyl-sulfonylmethyl)-benzoyl | Navy |
| 44 | 4-vinylsulfonyl-2-bromo-phenyl | 4-(β-chloroethyl-sulfonylmethyl)-benzoyl | Navy |
| 45 | 4-vinylsulfonyl-2-sulfo-phenyl | 4-(β-chloroethyl-sulfonylmethyl)-benzoyl | Navy |
| 46 | 4-vinylsulfonyl-2,6-dichloro-phenyl | 4-(β-chloroethyl-sulfonylmethyl)-benzoyl | Navy |
| 47 | 3-vinylsulfonyl-6-chloro-phenyl | 4-(β-chloroethyl-sulfonylmethyl)-benzoyl | Navy |
| 48 | 3-vinylsulfonyl-6-carboxy-phenyl | 4-(β-chloroethyl-sulfonylmethyl)-benzoyl | Navy |

I claim:

1. A water-soluble disazo compound conforming to the formula

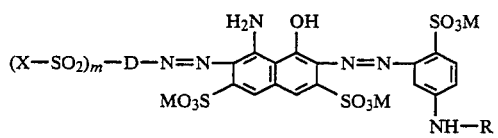

in which:

D is a benzene ring, unsubstituted or substituted by chlorine, bromine, alkyl of 1 to 4 carbon atoms, alkoxy of 1 to 4 carbon atoms or carboxy, or D is a naphthalene ring unsubstituted or substituted by sulfo;

X is vinyl or β-sulfatoethyl;

R is 3-(β-chloroethylsulfonylbenzoyl), 4-(β-chloroethylsulfonyl)-benzoyl, 3-(β-chloroethylsulfonylmethyl)-benzoyl, 4-(β-chloroethylsulfonylmethyl)-benzoyl, 3-(N-methyl-N-β-chloroethylsulfonyl)-aminobenzoyl or 4-(N-methyl-N-β-chloroethylsulfonyl)-aminobenzoyl, or 4-(β-chloroethylsulfonyl)-cinnamoyl;

M is hydrogen or an alkali metal;

m is the number 1 or 2.

2. A disazo compound as claimed in claim 1, wherein the formula radical X-SO₂-D- denotes a group of the formula

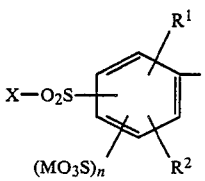

in which R¹ and R² are identical to or different from each other and R¹ denotes hydrogen or methyl, methoxy, ethoxy or carboxy or chlorine or bromine, R² stands for hydrogen or methyl, methoxy, or ethoxy or chlorine, and m denotes the number 1.

3. A disazo compound as claimed in claim 1, wherein D is a naphthalene ring unsubstituted or substituted by sulfo.

4. A disazo compound as claimed in claim 1, wherein X is β-sulfatoethyl.

5. A disazo compound as claimed in claim 1, wherein R is 3-(β-chloroethylsulfonyl)-benzoyl, 4-(β-chloroethylsulfonylmethyl)-benzoyl or 4-(N-methyl-N-β-chloroethylsulfonyl)-aminobenzoyl.

6. A disazo compound according to claim 2, wherein X is β-sulfatoethyl.

7. A disazo compound according to claim 3, wherein X is β-sulfatoethyl.

8. The compound of the formula

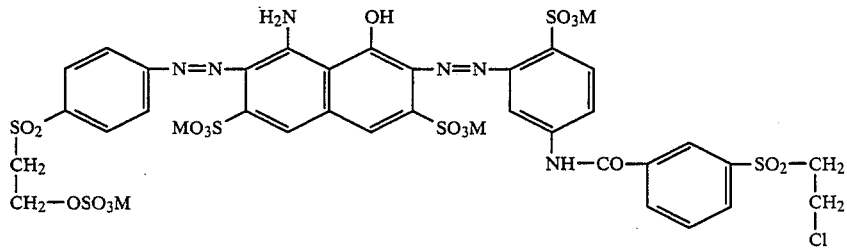

in which M is hydrogen or an alkali metal.

9. The compound of the formula

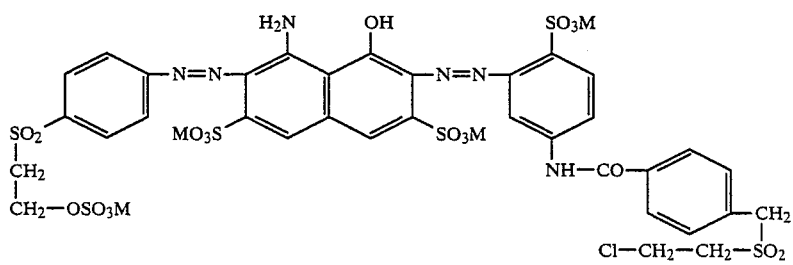

in which M is hydrogen or an alkali metal.

10. A disazo compound as claimed in claim 1, of the formula

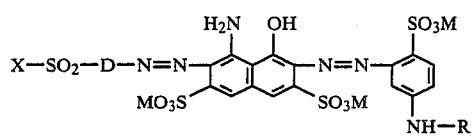

in which:

D is phenylene unsubstituted or substituted by alkoxy of 1 to 4 carbon atoms, or is naphthalene substituted by sulfo;

X is vinyl or β-sulfatoethyl;

R is 3-(β-chloroethylsulfonylbenzoyl), 4-(β-chloroethylsulfonyl)-benzoyl, 3-(β-chloroethylsulfonylmethyl)-benzoyl, 4-(β-chloroethylsulfonylmethyl)-benzoyl, 3-(N-methyl-N-β-chloroethylsulfonyl)-aminobenzoyl or 4-(N-methyl-N-β-chloroethylsulfonyl)-aminobenzoyl;

M is hydrogen or an alkali metal.

* * * * *